United States Patent [19]

Buck

[11] 4,281,022
[45] Jul. 28, 1981

[54] METHOD OF COOKING THIN MEATS IN A MICROWAVE OVEN

[75] Inventor: Ronald G. Buck, Burnsville, Minn.
[73] Assignee: Litton Systems, Inc., Beverly Hills, Calif.
[21] Appl. No.: 20,696
[22] Filed: Mar. 15, 1979

Related U.S. Application Data

[63] Continuation-in-part of Ser. No. 829,075, Aug. 30, 1977, abandoned.

[51] Int. Cl.³ .......................... A23L 1/31; H05B 9/06
[52] U.S. Cl. .................................. 426/233; 426/523; 426/243; 219/10.55 M; 219/10.55 B
[58] Field of Search ............... 426/233, 241, 243, 523; 219/10.55 M, 10.55 B, 10.55 R

[56] References Cited

U.S. PATENT DOCUMENTS

| | | | |
|---|---|---|---|
| 3,467,804 | 9/1969 | Smith | 219/10.55 B |
| 3,839,616 | 10/1974 | Risman | 219/10.55 R |
| 4,080,564 | 3/1978 | Nitta et al. | 219/10.55 B |

FOREIGN PATENT DOCUMENTS 2312067  1/1977  France .

*Primary Examiner*—Robert A. Yoncoskie
*Attorney, Agent, or Firm*—Robert E. Lowe; Edward P. Heller, III

[57] ABSTRACT

A method of cooking thin meat in a microwave oven by determining the temperature of the thin meat as a function of humidity and temperature environmental conditions of a microwave oven heating cavity. The relative humidity of the oven heating cavity is continuously sampled during cooking, and signals indicative of the humidity are provided to a digital computing device having a memory such as a programmable microprocessor. The slope of the curve of humidity as a function of elapsed time is compared to the slope of a characteristic curve for thin meats stored in the microprocessor. The doneness time is calculated from the comparison of the curves and cooking is terminated when the calculated doneness time is reached.

5 Claims, 2 Drawing Figures

4,281,022

METHOD OF COOKING THIN MEATS IN A MICROWAVE OVEN

CROSS REFERENCES TO COPENDING APPLICATIONS

This application is a continuation-in-part of my copending application entitled "Method of Cooking Thin Meats in a Microwave Oven", Ser. No. 829,075, filed Aug. 30, 1977 now abandoned.

BACKGROUND OF THE INVENTION

1. Field of the Invention

This invention relates generally to improvements in a microwave oven, and more particularly, pertains to a new and improved method of cooking thin meat in a microwave oven.

2. Description of the Prior Art

Those concerned with microwave cooking of a thin piece of meat in a microwave oven have long recognized the need to accurately determine the temperature of the meat. The present invention fills this need.

Past prior art devices have been extremely unreliable in determining the surface and internal temperature of meat. One initial prior art attempt at determining the internal doneness of meat was to insert a thermometer which was not affected by the microwave energy into the piece of meat being cooked. The disadvantage was that the thermometer only indicated the internal temperature of the meat at one particular location and was not a true overall indication of the equilibrium internal doneness of the meat.

Another current prior art device for measuring the internal temperature of meats being cooked is to insert a temperature probe into the meat while in the microwave oven heating cavity which connects to the control circuitry of the microwave oven. While the temperature probe is accurate in indicating the temperature of the meat being cooked by microwave energy, the probe only senses the temperature of the immediate area surrounding the probe and does not take into account the equilibrium state of the internal temperature of the meat. If the temperature of the meat is not uniform and the probe is placed at a hot spot in the meat, the readings from the temperature probe are not indicative of the internal doneness of the meat.

Further, the probe which is inserted into the meat is cumbersome and bulky for the cook who is trying to monitor the internal doneness of the meat during the microwave cooking in the microwave oven heating cavity. For a thin piece of meat being approximately equal to or less than one skin depth, it is difficult for a cook, if not impossible, to insert a temperature probe into the meat as the thickness may be less than one centimeter.

It has also been suggested to measure the humidity of the exhaust air from a microwave oven cavity to give certain indications of cooking conditions within the cavity. (See, for example, U.S. Pat. No. 3,839,616.) However, the technique disclosed is largely limited to detection of an abrupt rise in humidity when boiling occurs, at which time the power is interrupted.

It has also been suggested to measure cooking time as a function of some "trigger" humidity in combination with a progressive-regressive timer.

SUMMARY OF THE INVENTION

The present invention obviates the foregoing disadvantages of the prior art by providing a more accurate method of cooking thin meat in a microwave oven.

According to the preferred embodiment of the present invention, there is provided a method for cooking thin meat in a microwave oven wherein the time dependent humidity and temperature environmental conditions of a microwave oven heating cavity are sensed and sampled; the absolute humidity is determined from the sampled humidity and temperature, the determination being repeated at a plurality of time-spaced points; and the curve thus derived is compared with a "characteristic humidity curve". The temperature of the meat is determined from the curve comparison, especially the slope of the curves.

Thin meat is defined as a piece of meat having a thickness approximately equal to or less than one skin depth of the wavelength of the microwave energy. Since the meat is thin, that is being approximately equal to or less than one skin depth, the surface temperature of the meat is presumed to be approximately equal to the internal temperature of the meat.

BRIEF DESCRIPTION OF THE DRAWING

Other objects and many of the attendant advantages of this invention will be readily appreciated as the same becomes better understood by reference to the following detailed description when considered in connection with the accompanying drawings, in which like reference numerals designate like elements throughout the figures thereof and wherein.

DESCRIPTION OF THE PREFERRED EMBODIMENT

The invention provides a method of determining when a thin piece of meat is cooked to doneness by sensing the time dependent "in-situ" humidity and the temperature environmental conditions of the microwave oven heating cavity. The term "in-situ" as used in this application is defined as the actual time dependent environmental conditions which exist in the environment surrounding the food product such as thin meat which is located in and cooked in the microwave oven heating cavity. Although in the present invention a humidity sensor and a temperature sensor may be positioned outside of the microwave oven heating cavity, the sensors are configured to sense as nearly as possible the environmental conditions of the microwave oven heating cavity itself. The signal information provided to a programmable controller controlling the microwave oven is indicative of cooking cavity conditions.

Figure 1:
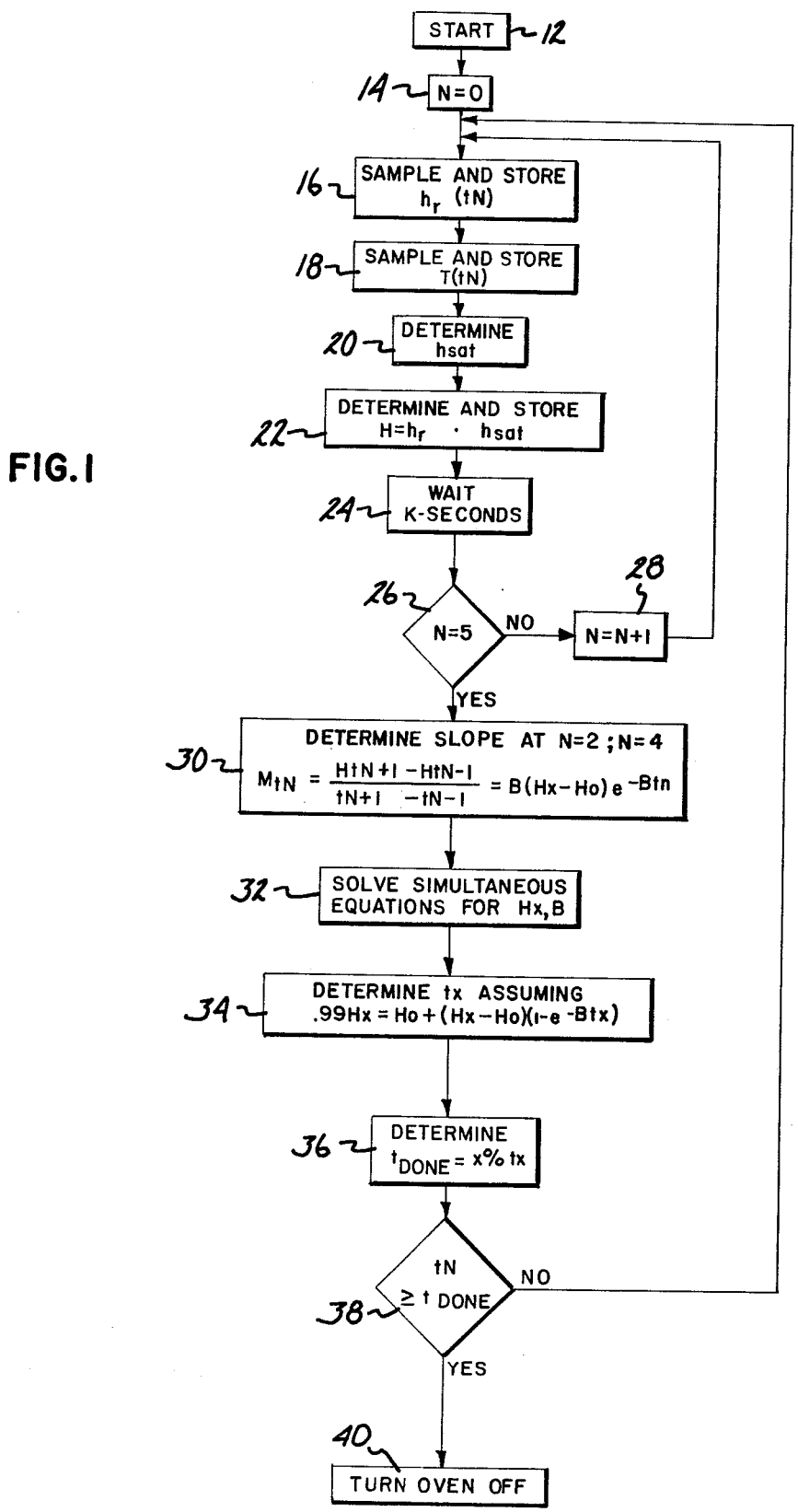
FIG. 1 illustrates a flow chart of the method of cooking thin meat in a microwave oven in accordance with the present invention.

FIG. 1 illustrates a flow chart of the method of cooking thin meat in accordance with the present invention.

The flow sequence start is indicated at 12, the first step being a zeroing indication to the controller indicating N=0 as shown at box 14. The symbol "N" indicates the sequential number of the sample being processed by the controller so that the controller can determine, for example, that the sample at sequence N=5 occurs after N=4 and before N=6. In this manner "N" is also a relative measurement of time and will be referred to in that aspect from time to time as the specification proceeds.

Box 16 calls for sampling and storing the relative humidity $h_r$ at time "N", written as "$t_N$". The sampling is made by a humidity sensor configured as described hereinafter, and the sample is provided to a digital computing device having a memory, such as a programmable microprocessor. Next the oven cavity temperature at time "N" is sampled and stored in the microprocessor as indicated at box 18.

The computing device next determines the saturated humidity at box 20 and then calculates the absolute humidity as a function of the sensed relative humidity and the calculated saturated humidity at box 22. The capital letter "H" is used to denote absolute humidity at box 22 and thereafter in order to diminish the number of subscripts necessary.

After determining absolute humidity at time "N" at box 22, the method waits some arbitrary time interval denoted as K seconds at box 24. The program interrogates to determine if five sequences of the foregoing steps have been accomplished. Since at this point N=0 because this is the first sequence, the interrogatory reply is NO, wherein the aforementioned steps are repeated and "N" is increased by one unit. These steps are pictorially represented at boxes 26 and 28.

The sequence of sampling, storing and calculating steps is continued until N=5 at which time the program proceeds along the YES branch from step 26. The absolute humidities determined in each sequence together form points on a humidity versus time curve, such as that shown in FIG. 2. The slope of the curve can be determined at points N=2 and N=4 by observing the changes between N=1 and N=3 and N=3 and N=5 respectively. The slope M at any time N is indicated by the equations at step 30.

Figure 2:
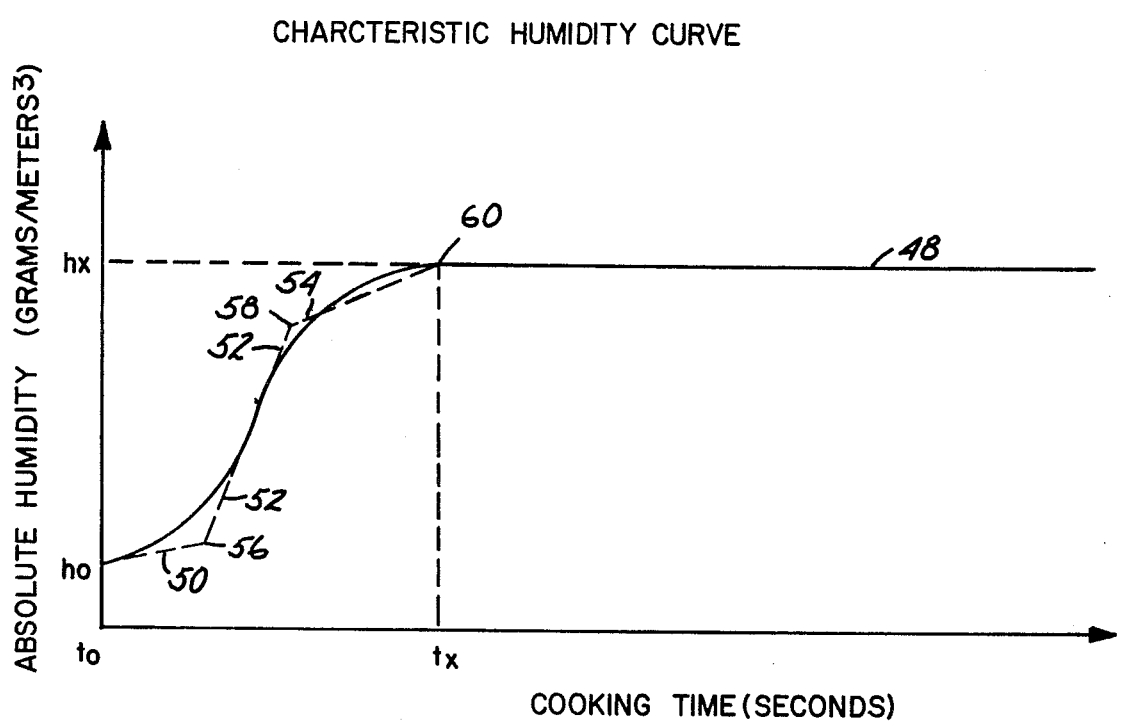
FIG. 2 illustrates a typical "characteristic humidity curve" for the present invention.

It has been empirically determined and observed that a thin meat body being heated in a microwave oven will follow a characteristic humidity curve as that shown in FIG. 2. The precise characteristics defining that curve can be stored in the memory of a programmable microprocessor. The curve has been found to be defined by the equation:

$$H_{tN} = Ho + (Hx - Ho)(1 - e^{-BtN}) \quad \text{(Eq. 1)}$$

Wherein Ho is the absolute humidity at time N=0, Hx is the absolute humidity at thermal equilibrium (peak absolute humidity) and B coefficient characteristic of meats.

At time intervals N=2 and N=4 equation 1 can be written:

$$H_{t2} = Ho + (Hx - Ho)(1 - e^{-Bt2}) \quad \text{(Eq. 2)}$$

and $$H_{t4} = Ho + (Hx - Ho)(1 - e^{-Bt4}) \quad \text{(Eq. 3)}$$

Simultaneous equations can now be solved at box 32 by taking the derivatives of equations 2 and 3 and rearranging terms to isolate the exponential quantities, which yields:

$$e^{-Bt2} = \frac{M_{t2}}{B(Hx - Ho)}$$

and $$e^{-Bt4} = \frac{M_{t4}}{B(Hx - Ho)}$$

Substituting equation 4 into equation 2 yields:

$$H_{t2} = Ho + (Hx - Ho)\left[1 - \frac{M_{t2}}{B(Hx - Ho)}\right]$$

Similarly substituting equation 5 into equation 3 yields: or:

$$\text{or: } H_{t2} - Hx - \frac{M_{t2}}{B}$$

$$H_{t4} - Hx - \frac{M_{t4}}{B}$$

Subtracting equation 6 from equation 7 and isolating B yields:

$$B = \frac{M_{t2} - M_{t4}}{H_{t4} - H_{t2}}$$

Accordingly it can be seen that the determination of absolute humidity at points N=0 through N=5 allows the mathematical solution of the slope of the curve at two spaced points. Comparison of that slope with the stored slope of the characteristic curve allows computation of B, the characteristic coefficient for the food being cooked. Equations 6 and 7 can then be solved for Hx.

Having determined Hx, the time tx that the thin meat will reach thermal equilibrium is calculated at box 34. Thereafter, any desired doneness time can be calculated as a percentage of tx at box 36. The "x%" shown can be stored in the memory of the microprocessor or can be operator enterable if desired. For example, if it is empirically determined that for hamburger 80% of the time required to reach thermal equilibrium, tx, will yield a rare hamburger, then $t_{done}$ equals 80% of tx for that application. Appropriate function pads located on the oven control panel would allow the operator to select, for example, "hamburger rare". That selection would cause 80% of tx to be input to the microprocessor as "$t_{done}$".

Finally the method determines at block 38 if the time $t_N$ is equal to or greater than $t_{done}$. If it is not, the NO branch is followed and the entire sequence is performed again. If it is, then $t_{done}$ has been reached and the oven is turned off at block 40.

PREFERRED MODE OF OPERATION

The method of cooking thin meat in a microwave oven is premised on the sensing concept based on the most fundamental cooking principles. That is, as microwave energy is converted from thermal energy, the internal temperature of the meat increases. As the internal temperature of the meat increases, some of the thermal energy is used to break the bonding forces holding the water molecules to the food's cell structure. When the latent heat of vaporization has been added to the food, these free water molecules are vaporized and released locally. Thus, the rate of evaporation is directly proportional to the rate of temperature rise. By monitoring time dependent environmental conditions of the microwave oven heating cavity with sensors, the meat's internal temperature and surface temperature for a thin piece of meat are determined.

The "characteristic humidity curve" 48 of absolute humidity in grams per cubic meter versus cooking time in seconds of FIG. 2 for the thin meat equation 1 is determined by sensing the time dependent "in-situ" humidity and temperature environmental conditions of the microwave oven heating cavity during microwave cooking of thin meats. The time dependent "in-situ" environmental conditions are defined as the sensed humidity and temperature of the microwave oven heating cavity by humidity and temperature sensors.

FIG. 2 depicts a characteristic humidity curve derived from a plot of absolute humidity versus elapsed cooking time. The changes in slope of the curve are indicative of the rate of evaporative water loss from the thin meat body effecting the absolute humidity in the cooking cavity. For purposes of the present method, the point of peak absolute humidity, hx, indicated at 60 is of primary interest. The "characteristic humidity curve" 48 plateaus at point 60 indicating that surface temperature of the meat has reached equilibrium at one hundred degrees centigrade.

For small meat samples or with thicknesses small as compared to the microwave depth of penetration, that is, being approximately equal to or less than one skin depth, the internal temperature is approximately and for all practical considerations the same as the surface temperature. Thus, the temperature for a thin piece of meat can be monitored for internal doneness finding the temperature from equation 1 for any point of the "characteristic humidity curve" of FIG. 2.

The basic premise of the method is that as the relative humidity and temperature are sampled and stored, hx and B are computed by solving simultaneous equation 32 to predict when the one hundred degree centigrade point 60 occurs. The temperature is assumed linear between $h_o$ and one hundred degrees centigrade so that once tx is computed, the corresponding time for any other temperature may be computed such as to determine when $t_{done}$ is reached.

The method may be implemented in accordance with the flow chart of FIG. 1 as an algorithm stored in a programmable controller such as an Intel 8080 Microprocessor in the microwave oven. This algorithm of FIG. 1 determines the temperature for a thin piece of meat for any point on the "characteristic humidity curve" of FIG. 2.

An aluminum oxide humidity sensor, such as a Thunder Scientific PC-2000 Humidity Measurement Module, and a temperature sensor, such as a National Semiconductor Corporation LX 5700 Temperature Transducer, are positioned adjacent to and by the exit ventilation port to the exterior side of the microwave oven heating cavity by way of example and for purposes of illustration only to sense the time dependent "in-situ" environment conditions of the microwave oven heating cavity. The sensors can be positioned anywhere as long as the time dependent "in-situ" environmental conditions of the microwave oven heating cavity are sensed, and the sensors are electromagnetically protected from the microwave oven heating cavity. The humidity sensor and the temperature sensor connect to the programmable controller having the steps of the algorithm of FIG. 1 stored in the memory of the programmable controller. The programmable controller connects to control the microwave power supply and turns the oven off when a YES condition for block 38 is determined.

Various modifications can be contemplated for the method of cooking thin meat in a microwave oven of the present invention without departing from the apparent scope of this invention.

Having thus described the invention, what is claimed is:

1. A method for cooking thin meat bodies in a microwave oven having means for measuring the humidity of the microwave oven cooking cavity environment associated therewith comprising the steps of:
    (a) energizing a microwave energy source to provide microwave energy to said cooking cavity whereby at least a portion of said energy is absorbed by a thin meat body located in said cooking cavity;
    (b) measuring the humidity of said cooking cavity environment at a plurality of time-spaced intervals while said thin meat body is being heated and storing said measurements in a microprocessor forming part of the controls for said oven;
    (c) calculating the slope of a humidity-time curve described by said measurements;
    (d) comparing said calculated slope with the slope of a characteristic humidity-time curve stored in said microprocessor and obtaining from said comparison the time when said thin meat body will reach thermal equilibrium at 100° C.;
    (e) calculating in said microprocessor the time said thin meat body will reach a preselected doneness as a predetermined percentage of said thermal equilibrium time; and,
    (f) de-energizing said microwave energy source at said calculated doneness time.

2. The method of claim 1 wherein said measuring the humidity of the microwave oven cooking cavity environment comprises sensing the cavity environment relative humidity and temperature and wherein said humidity measuring step includes the calculation of absolute humidity of said cavity environment from the sensed relative humidity and temperature.

3. The method of claim 1 wherein said characteristic humidity-time curve is described by the equation:

$$H_{tN} = Ho + (Hx - Ho)(1 - e^{-BtN})$$

wherein $H_{tN}$ = absolute humidity at time interval N
Ho = absolute humidity at time interval N = 0
Hx = peak absolute humidity at thermal equilibrium
B = a coefficient, characteristic of said thin meat body, and
$t_N$ = elapsed time at interval N.

4. The method of claim 1 wherein said predetermined percentage is stored in said microprocessor.

5. The method of claim 1 further including a step performed after step (e) and before step (f) of
    (e') comparing a total elapsed heating time with said calculated doneness time and repeating steps (b) through (e') if said elapsed time is less than said calculated doneness time.

* * * * *